United States Patent
Dharmasena et al.

(10) Patent No.: US 11,955,666 B2
(45) Date of Patent: Apr. 9, 2024

(54) BATTERY SYSTEM, BATTERY PACK HANDLING SYSTEM AND ELECTROLYTE EVACUATION AND REFILL STATION

(71) Applicant: GM GLOBAL TECHNOLOGY OPERATIONS LLC, Detroit, MI (US)

(72) Inventors: Ruchira Dharmasena, Shelby Township, MI (US); Meinan He, Madison Heights, MI (US); Mei Cai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 563 days.

(21) Appl. No.: 17/156,782

(22) Filed: Jan. 25, 2021

(65) Prior Publication Data
US 2022/0238972 A1 Jul. 28, 2022

(51) Int. Cl.
*H01M 50/609* (2021.01)
*H01M 50/103* (2021.01)
*H01M 50/204* (2021.01)

(52) U.S. Cl.
CPC ....... *H01M 50/609* (2021.01); *H01M 50/103* (2021.01); *H01M 50/204* (2021.01)

(58) Field of Classification Search
CPC . H01M 50/204; H01M 50/609; H01M 50/103
See application file for complete search history.

(56) References Cited

U.S. PATENT DOCUMENTS

| 2012/0171537 | A1 | 7/2012 | Sakai et al. | |
| 2012/0319695 | A1* | 12/2012 | Yano | H01M 10/486 |
| | | | | 324/427 |
| 2019/0088981 | A1* | 3/2019 | Chen | H01M 4/13 |
| 2020/0321663 | A1* | 10/2020 | Chen | H01M 8/18 |

FOREIGN PATENT DOCUMENTS

| CN | 102738534 A | 10/2012 |
| CN | 205303523 U | 6/2016 |
| CN | 205882113 U | 1/2017 |
| CN | 207624845 U | 7/2018 |
| CN | 111261923 A | 6/2020 |

(Continued)

*Primary Examiner* — Brian R Ohara
*Assistant Examiner* — Michelle T Leonard
(74) *Attorney, Agent, or Firm* — Quinn IP Law

(57) ABSTRACT

A battery system includes an enclosure having opposed first and second major walls, a perimetral wall connecting the first and second major walls along respective perimeters thereof, and an interior defined by the first and second major walls and the perimetral wall, wherein the enclosure is configured for containing an anode assembly, a cathode assembly and an electrolyte within the interior. A longitudinal embossment is formed in the perimetral wall extending outward from the interior and extending along opposed adjacent portions of the first and second perimeters. A wall port is defined in the perimetral wall in fluid communication with the interior, wherein the wall port is configured for permitting flow of the electrolyte therethrough into and out of the interior. First and second electrodes extend through the perimetral wall and are configured for electrical connection with the anode assembly and cathode assembly, respectively.

13 Claims, 11 Drawing Sheets

(56) References Cited

FOREIGN PATENT DOCUMENTS

| | | | |
|---|---|---|---|
| CN | 111937203 | A | 11/2020 |
| DE | 102006021583 | B3 | 11/2007 |
| GB | 2031218 | A | 4/1980 |
| JP | 2006210257 | A | 8/2006 |
| JP | 2011054420 | A | 3/2011 |
| JP | 2014022073 | A | 2/2014 |
| JP | 2015198029 | A | 11/2015 |
| JP | 2017216046 | A | 12/2017 |
| KR | 20180038880 | A | 4/2018 |

\* cited by examiner

BATTERY SYSTEM, BATTERY PACK HANDLING SYSTEM AND ELECTROLYTE EVACUATION AND REFILL STATION

INTRODUCTION

This disclosure relates generally to battery systems, battery pack handling systems and electrolyte evacuation and refill stations for battery systems.

Batteries are becoming more frequently used in a wide variety of applications, including automotive vehicles. Most batteries rely on chemical reactions within the battery cells to generate electricity and/or to store electrical charge. However, chemical-based batteries produce gas byproducts such as carbon dioxide and ethene, and the chemicals used within batteries may deteriorate with age which decreases their ability to produce electrical current and/or to store electrical energy.

It is common practice to replace batteries at prescribed intervals or when a battery's performance falls below a predetermined level. However, this approach can be expensive for the owner and a burden for the supply chain.

SUMMARY

According to one embodiment, a battery system includes a generally prismatic enclosure having opposed first and second major walls with respective first and second perimeters, a perimetral wall connecting the first and second major walls along the first and second perimeters, and an interior defined by the first and second major walls and the perimetral wall, wherein the enclosure is configured for containing an anode assembly, a cathode assembly and an electrolyte operatively disposed within the interior. A longitudinal embossment is formed in the perimetml wall extending outward from the interior and extending along opposed adjacent portions of the first and second perimeters. A wall port is defined in the perimetral wall in fluid communication with the interior, wherein the wall port is configured for permitting flow of the electrolyte therethrough into and out of the interior. First and second electrodes extend through the perimetral wall and are configured for electrical connection with the anode assembly and cathode assembly, respectively.

Each of the first and second major walls may be generally rectangular with each having a respective width and a respective height smaller than the respective width, wherein the longitudinal embossment has a length extending along the respective heights. The battery assembly may further include the aforementioned anode assembly, cathode assembly and electrolyte operatively disposed within the interior of the enclosure. The longitudinal embossment may define a conduit on an interior side thereof, wherein the conduit is configured for permitting flow of a gas byproduct therethrough.

The battery system may further include a manifold having an inner channel therein and a plurality of fittings each in fluid communication with the inner channel, each of the fittings being configured for coupling with the wall port for permitting flow of the electrolyte between the inner channel of the manifold and the interior of the enclosure. The battery system may further include: (i) the anode assembly, the cathode assembly and the electrolyte operatively disposed within the interior of the enclosure, wherein the first and second electrodes are electrically connected with the anode assembly and cathode assembly, respectively; (ii) a gas handler operatively connected with the manifold for receiving and/or filtering gas byproduct from the interior of the enclosure, wherein the manifold is operatively connected with the enclosure; and (iii) a refill port operatively connected with the manifold for evacuating electrolyte from the interior of the enclosure and for introducing electrolyte into the interior of the enclosure, wherein the refill port is configured for fastenable extension through a housing wall of a housing, wherein the housing is configured for containing the enclosure, the manifold and the gas handler.

The battery system may further include a first duct operatively connecting the manifold and the gas handler, a first valve disposed in the first duct and configured to open and close flow through the first duct, a second duct operatively connecting the manifold and the refill port, and a second valve disposed in the second duct and configured to open and close flow through the second duct. The battery system may also include: (i) a boot cover having a wrap-around wall surrounding and defining a plenum therewithin, an opening in the wrap-around wall defined by a lip about the opening, and a gas port and a liquid port each defined in the wrap-around wall, wherein the gas port is in fluid communication with the plenum, and wherein the liquid port has an inner connector portion disposed within the plenum and configured for coupling with the refill port when the boot cover is placed over the refill port with the lip in sealed engagement with an outer surface of the housing wall; (ii) a first pump operatively connected with the gas port and configured for applying suction to the gas port; and (iii) a second pump operatively connected with the liquid port and configured for applying suction to the liquid port. Additionally, the battery system may include a third duct operatively connecting the gas port and the first pump, and a fourth duct operatively connecting the liquid port and the second pump.

The battery system may further include a gas byproduct tank configured for receiving gas byproduct from the first pump via a fifth duct operatively connecting the first pump and the gas byproduct tank, and a used electrolyte tank configured for receiving electrolyte from the second pump via a sixth duct operatively connecting the second pump and the used electrolyte tank. The battery system may also include a fresh electrolyte tank configured for supplying electrolyte to the liquid port, wherein the second pump is operatively connected with the liquid port and/or the fresh electrolyte tank and is further configured to cause electrolyte from the fresh electrolyte tank to be pumped to the liquid port. Alternatively, the battery system may also include a fresh electrolyte tank configured for supplying electrolyte to the liquid port, and a third pump operatively connected with the liquid port and/or the fresh electrolyte tank and configured to cause electrolyte from the fresh electrolyte tank to be pumped to the liquid port. The battery system may additionally include a collector/tester configured for receiving and/or testing a sample of electrolyte from the enclosure, wherein the collector/tester is operatively connected with at least one of the liquid port, the fourth duct, the sixth duct and the second pump.

According to another embodiment, a battery pack handling system for an automotive vehicle having an exterior body panel and carrying a battery pack includes a gas handler configured for receiving gas byproduct from the battery pack, a first duct configured for conveying the gas byproduct from the battery pack to the gas handler, a refill port configured for fastenable extension through the exterior body panel and for connecting with the battery pack (wherein the refill port is configured for evacuating electrolyte from the battery pack and for introducing electrolyte into the battery pack), and a second duct configured for conveying electrolyte between the battery pack and the refill port. The gas handler may be configured to be disposed above the battery pack, and the gas handler may be further configured for filtering the gas byproduct received from the battery pack.

According to yet another embodiment, an electrolyte evacuation and refill station for servicing a battery pack carried on-board an automotive vehicle, the automotive vehicle having a refill port operatively connected with the battery pack and extending through an exterior body panel, includes: (i) a boot cover having a wrap-around wall surrounding and defining a plenum therewithin, an opening in the wrap-around wall defined by a lip about the opening, and a gas port and a liquid port each defined in the wrap-around wall, wherein the gas port is in fluid communication with the plenum, and wherein the liquid port has an inner connector portion disposed within the plenum and configured for coupling with the refill port when the boot cover is placed over the refill port with the lip in sealed engagement with the exterior body panel; (ii) a first pump operatively connected with the gas port and configured for applying suction to the gas port; (iii) a second pump operatively connected with the liquid port and configured for applying suction and/or pressure to the liquid port; (iv) a gas byproduct tank operatively connected with a first outlet of the first pump and configured for receiving gas byproduct from the battery pack via the refill port and the first pump; (v) a used electrolyte tank operatively connected with a second outlet of the second pump and configured for receiving electrolyte from the battery pack via the refill port and the second pump; and (vi) a fresh electrolyte tank configured for supplying electrolyte to the liquid port.

The second pump may be operatively connected with the liquid port and/or the fresh electrolyte tank and may be further configured to cause electrolyte from the fresh electrolyte tank to be pumped to the liquid port. The electrolyte evacuation and refill station may further include a third pump operatively connected with the liquid port and/or the fresh electrolyte tank and configured to cause electrolyte from the fresh electrolyte tank to be pumped to the liquid port. The electrolyte evacuation and refill station may further include a collector/tester configured for receiving and/or testing a sample of electrolyte from the battery pack, wherein the collector/tester is operatively connected with at least one of the liquid port, the fourth duct, the sixth duct and the second pump.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
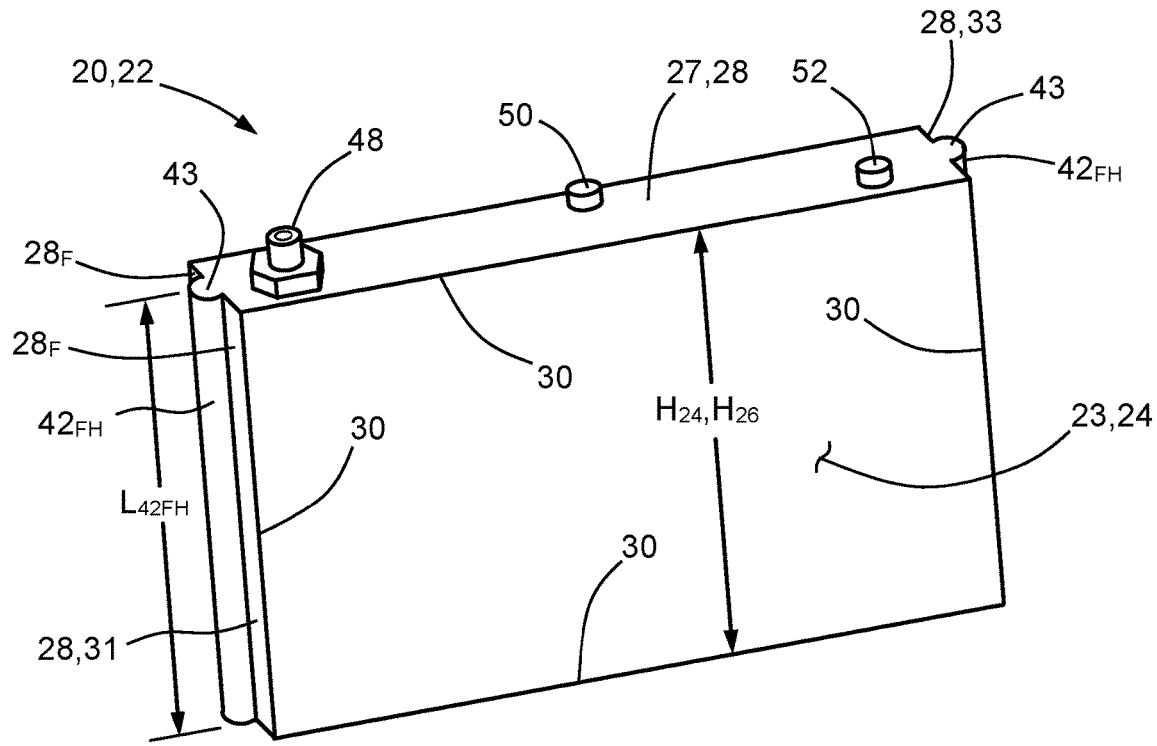
FIG. 1 is a schematic perspective of one configuration of a battery system.

Referring now to the drawings, wherein like numerals indicate like parts in the several views, a battery system 20, a battery pack handling system 100 for an automotive vehicle 10, and an electrolyte evacuation and refill station 200 for servicing a battery pack 20 carried on-board an automotive vehicle 10 are shown and described herein. Note that as used herein, "battery system" and "battery pack", including single or multiple cells thereof, may sometimes be used interchangeably. Also note that certain reference numerals in the drawings have subscripts, such as the longitudinal embossments $42_{FH}$ and $42_{PH}$ of FIGS. 1-4, 7-8 and 10. Subscripts are used in the drawings and in the present description to refer to individual elements and/or to a specific type of element, while the use of reference numerals without subscripts may refer to the collective group of such elements and/or to a singular but generic one of such elements. Thus, reference numeral $42_{FH}$ refers to a specific individual embossment or a specific type of embossment, while reference numeral 42 (without the subscript) may refer to all the embossments, the group of embossments, or a singular but generic embossment (i.e., any embossment).

Figure 2:
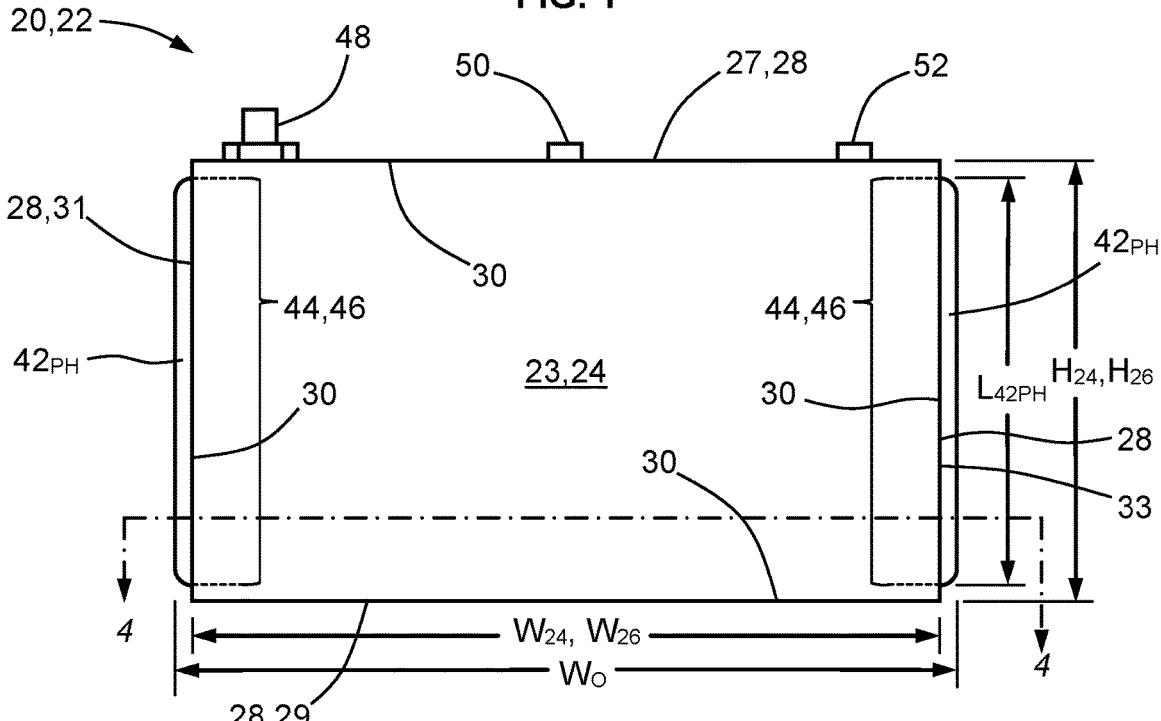
FIG. 2 is a schematic front view of another configuration of a battery system.
Figure 3:
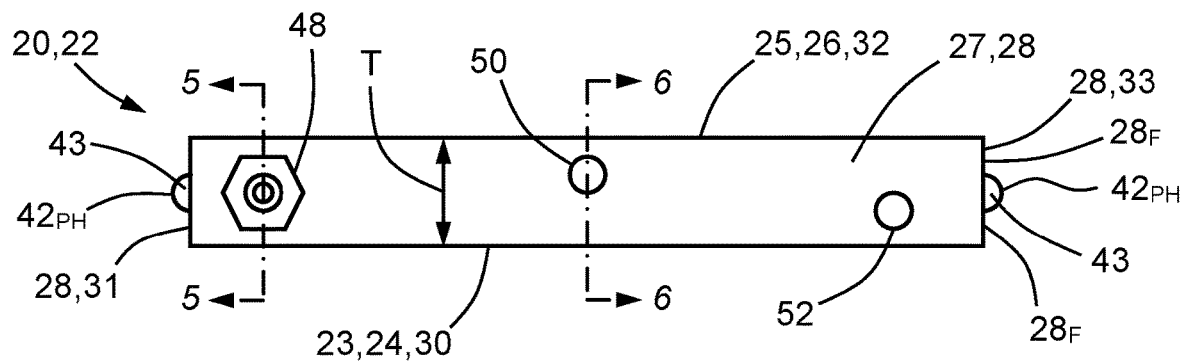
FIG. 3 is a schematic top view of the battery system of FIG. 2.
Figure 4:
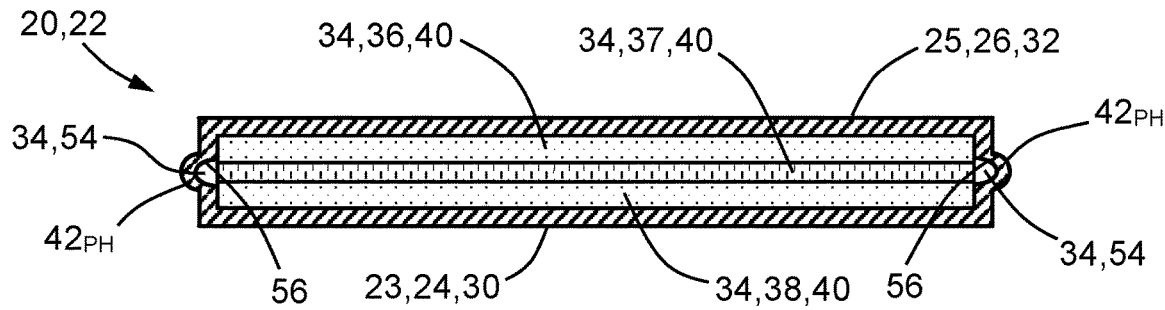
FIG. 4 is a schematic cross-sectional top view of the battery system of FIG. 2 as viewed along line 4-4.
Figures 5, 6, 7:
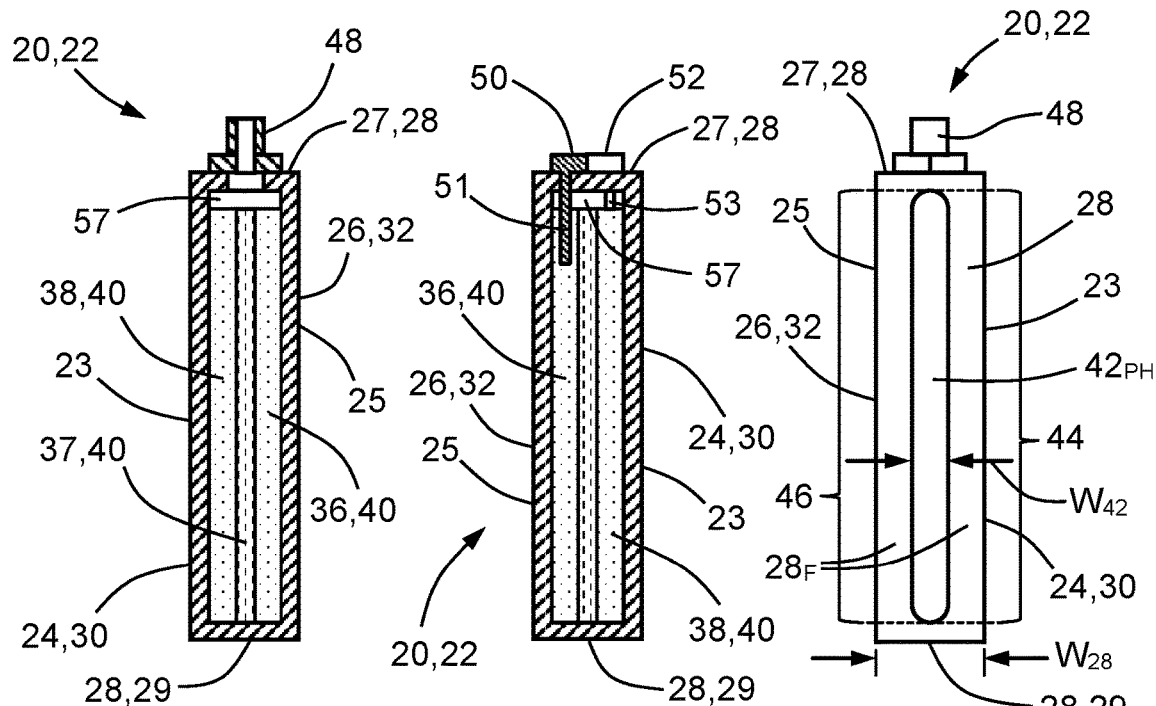
FIGS. 5-6 are schematic cross-sectional side views of the battery system of FIGS. 2-3 as viewed along lines 5-5 and 6-6, respectively.
FIG. 7 is a schematic side view of the battery system of FIGS. 2-3.
Figure 8:
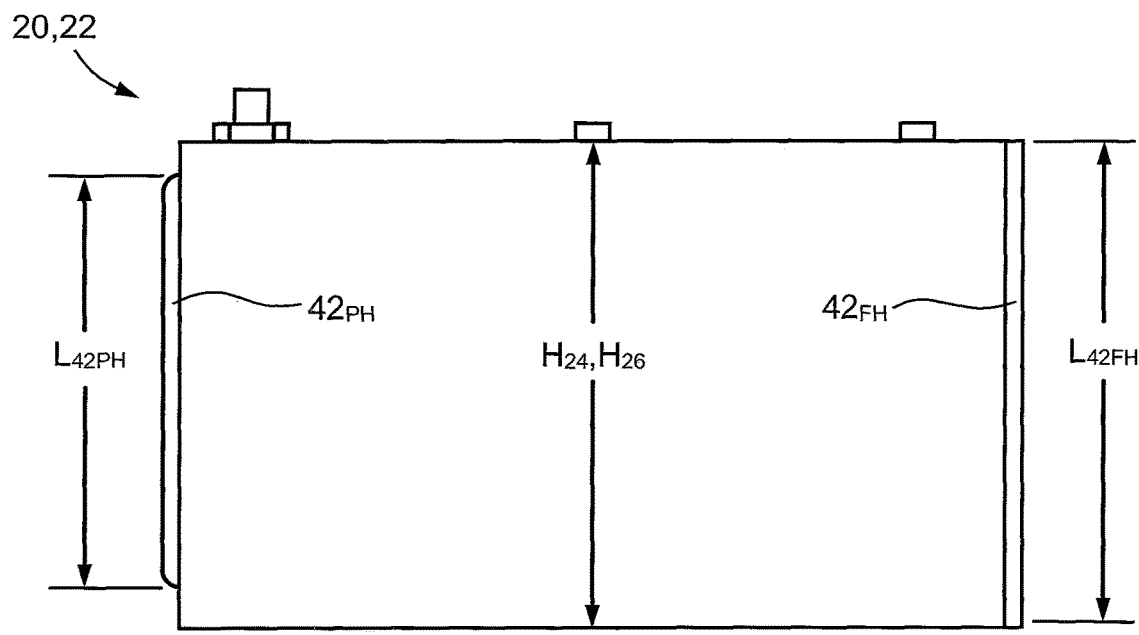
FIG. 8 is a schematic front view of yet another configuration of a battery system.
Figure 9:
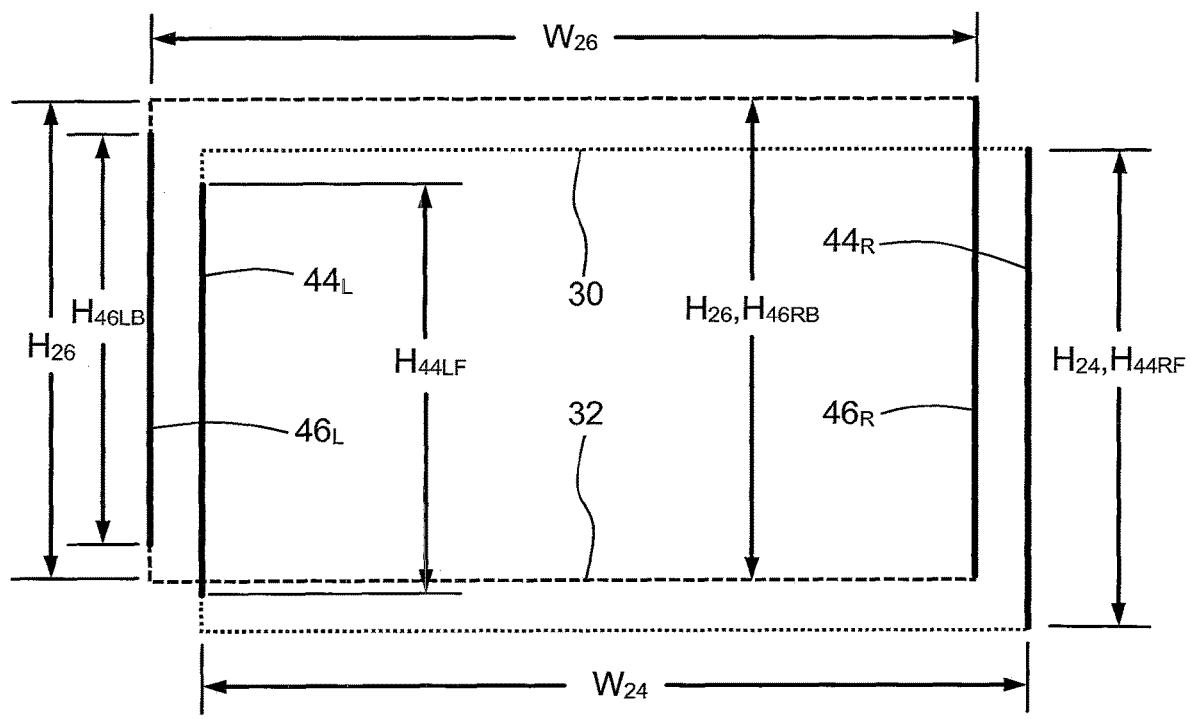
FIG. 9 is a schematic perspective view of first and second perimeters of the battery system of FIG. 8.

FIG. 1 shows a schematic perspective view of one configuration of a battery system 20, and FIG. 2 shows a schematic front view of another configuration of a battery system 20. Note that the configurations shown here feature two different arrangements of longitudinal embossments 42, as described in more detail below. Additionally, FIG. 3 shows a schematic top view of the battery system 20 of FIG. 2, FIG. 4 shows a schematic cross-sectional top view of the battery system 20 of FIG. 2 as viewed along line 4-4, FIGS. 5-6 show schematic cross-sectional side views of the battery system 20 of FIGS. 2-3 as viewed along lines 5-5 and 6-6, respectively, and FIG. 7 shows a schematic side view of the battery system 20 of FIGS. 2-3. Further, FIG. 8 shows a schematic front view of yet another configuration of a battery system 20, and FIG. 9 shows a schematic perspective view of first and second perimeters 30, 32 of the battery system 20 of FIG. 8.

According to the configurations shown, the battery system 20 includes a generally prismatic enclosure 22 having a first major wall 24 and an opposed second major wall 26, with the first and second major walls 24, 26 having respective first and second perimeters 30, 32 and respective first and second widths $W_{24}$, $W_{26}$. A perimetral wall 28 extends between the first and second major walls 24, 26 and connects the first and second major walls 24, 26 along and around the full extent of the first and second perimeters 30, 32, with the perimetral wall 28 having a perimetral wall width $W_{28}$ as measured between the first and second major walls 24, 26 and including one or more generally flat perimetral surfaces $28_F$. (That is, the first major wall 24 is connected to the perimetral wall 28 along the first perimeter 30, and the second major wall 26 is connected to the perimetral wall 28 along the second perimeter 32.) For example, the enclosure 22 may have the shape of a rectangular prism in which the first and second major walls 24, 26 are generally flat and parallel with each other, with each having the same size and same generally rectangular shape as each other. In such an arrangement, the first and second perimeters 30, 32 would have generally the same rectangular shape and size as each other, and the perimetral wall 28 would connect the first and second major walls 24, 26 together at their respective first and second perimeters 30, 32, thus forming a closed container (i.e., the enclosure 22). In this rectangular prismatic configuration, the first and second major walls 24, 26 may be viewed as front and back surfaces 23, 25, respectively, and the perimetral wall 28 may be viewed as four contiguous circumferential walls or surfaces, such as opposed top and bottom surfaces 27, 29 and opposed left and right surfaces 31, 33. In alternative arrangements, the first and second major walls 24, 26 may be circular, ellipsoidal or shaped as rectangles having rounded corners. In any case, the perimeters 30, 32 define a circumferential direction about the enclosure 22; thus, it can be said that the perimetral wall 28 extends circumferentially about the enclosure 22. (Note that as used herein, the directional use of the word "about" may mean "along", "along the length of", "coextensive with", "around" and/or "oriented in the same major direction as", depending on the context.)

An interior 34 is defined by and within the first and second major walls 24, 26 and the perimetral wall 28, with the enclosure 22 being configured for containing or housing an anode assembly 36, a cathode assembly 38 and an electrolyte 40 operatively disposed within the interior 34. An intermediate layer 37 (e.g., a polymer separator) may optionally be disposed between the anode and cathode assemblies 36, 38, with the electrolyte 40 permeating the anode and cathode assemblies 36, 38 and the optional intermediate layer 37.

One or more longitudinal embossments or protrusions 42 are formed in and along the perimetral wall 28, such that each embossment 42 extends or protrudes outward from the interior 34 and from one or more generally flat perimetral surfaces $28_F$ and extends along and between opposed adjacent portions 44, 46 of the first and second perimeters 30, 32. These embossments 42 are described as "longitudinal" because each one extends along some length circumferentially about the perimeters 30, 32 and the perimetral wall 28, thus giving each embossment 42 an elongated linear shape having a length much longer than its thickness. The longitudinal embossment 42 has an embossment width $W_{42}$ that is less than the perimetral wall width $W_{28}$ and outer width Wo (as measured across the opposed adjacent portions 44, 46 of the first and second perimeters 30, 32) that is greater than either of the first and second widths $W_{24}$, $W_{26}$. The longitudinal embossment 42 may define a conduit or channel 54 on an interior side 56 of the embossment 42, wherein the conduit 54 is configured for permitting flow of a gas byproduct 58 therethrough, as further described below.

Figure 10:
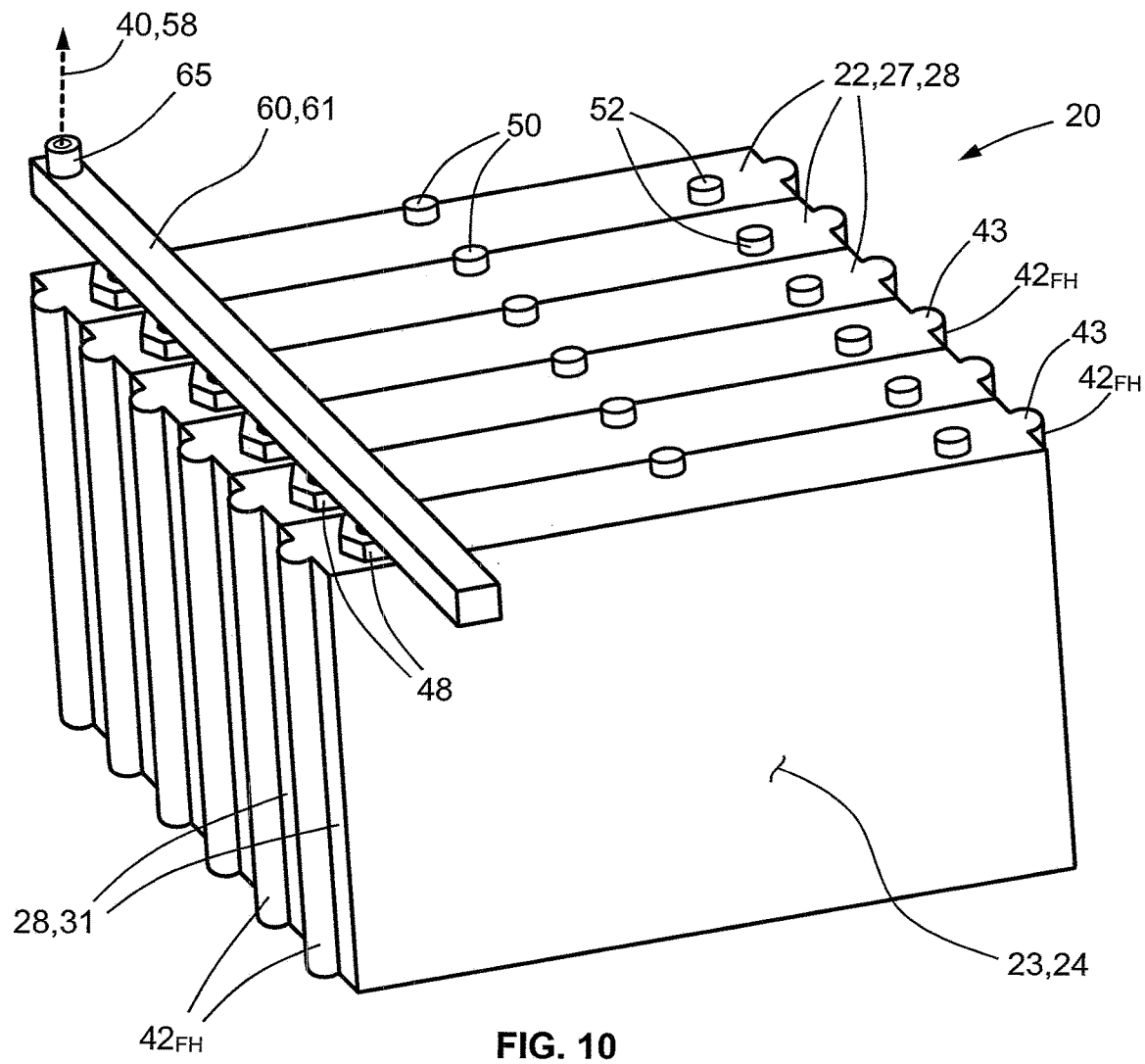
FIG. 10 is a schematic perspective view of a battery system including a manifold.

While the longitudinal embossments 42 may assume various shapes and configurations, several exemplary configurations are illustrated in the drawings. For example, FIGS. 1 and 10 show "full-height" longitudinal embossments $42_{FH}$ whose lengths $L_{42FH}$ extend along the entire height of an enclosure 22, such that each end of each longitudinal embossment $42_{FH}$ terminates in a respective end face 43 that is flush with the adjacent top or bottom surface 27, 29. Alternatively, FIGS. 2-7 show "partial-height" longitudinal embossments $42_{PH}$ whose lengths $L_{42PH}$ extend along most of the height of an enclosure 22 but not along its entire height, with each end of each longitudinal embossment $42_{PH}$ tapering to become flush with the surrounding flat surface of the perimetral wall 28. (Note that reference numeral 42 may be used herein to refer to either or both of the full-height and partial-height longitudinal embossments $42_{FH}$, $42_{PH}$, and reference numeral $L_{42}$ may be used to refer to either or both of the respective lengths $L_{42FH}$, $L_{42PF}$ of the full-height and partial-height longitudinal embossments $42_{FH}$, $42_{PH}$.) In some configurations, each of the first and second major walls 24, 26 may be generally rectangular with each wall 24, 26 having a respective width $W_{24}$, $W_{26}$ and a respective height $H_{24}$, $H_{26}$ smaller than the respective width $W_{24}$, $W_{26}$ (i.e., $H_{24}<W_{24}$ and $H_{26}<W_{26}$), wherein each of the one or more longitudinal embossments 42 has a respective length $L_{42}$ extending along (i.e., in the same direction as) one or both of the respective heights $H_{24}$, $H_{26}$.

FIG. 8 shows a schematic front view of yet another configuration of a battery system 20 that is a "hybrid" of the configuration shown in FIGS. 1 and 10 and the other configuration shown in FIGS. 2-7, and FIG. 9 shows a schematic perspective view of the first and second perimeters 30, 32 of this hybrid configuration. More specifically, the hybrid configuration of FIG. 8 has a partial-height longitudinal embossment $42_{PH}$ on its left side and a full-height longitudinal embossment $42_{FH}$ on its right side, with FIG. 9 showing the various dimensions of the configuration's walls 24, 26 and embossments 42. Note that the first perimeter 30 (shown in dotted lines) has a rectangular shape with a width $W_{24}$ and a height $H_{24}$, and the second perimeter 32 (shown in dashed lines and behind the first perimeter 30) has the same rectangular size and shape as the first perimeter 30, with a width $W_{26}$ and a height $H_{26}$. Since both perimeters 30, 32 have the same size and rectangular shape, then $W_{24}=W_{26}$ and $H_{24}=H_{26}$.

Figure 20:
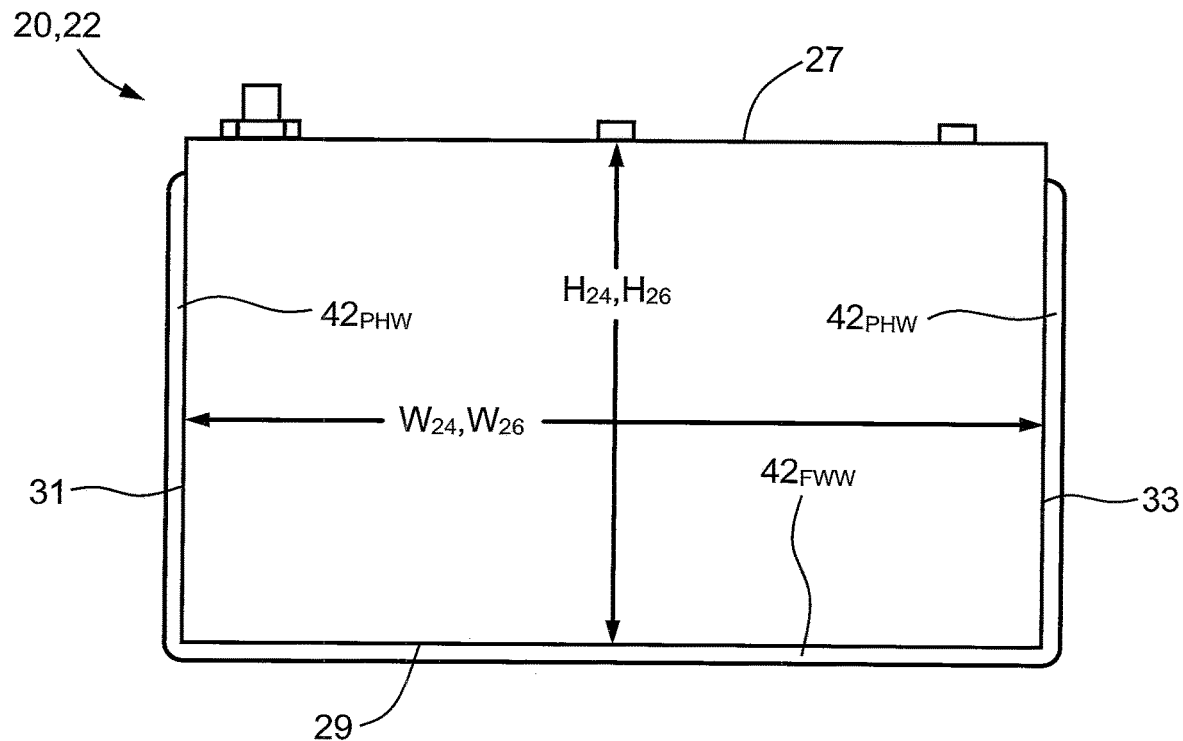
FIGS. 20-21 are schematic front views of two alternative configurations of a battery system.
Figure 21:
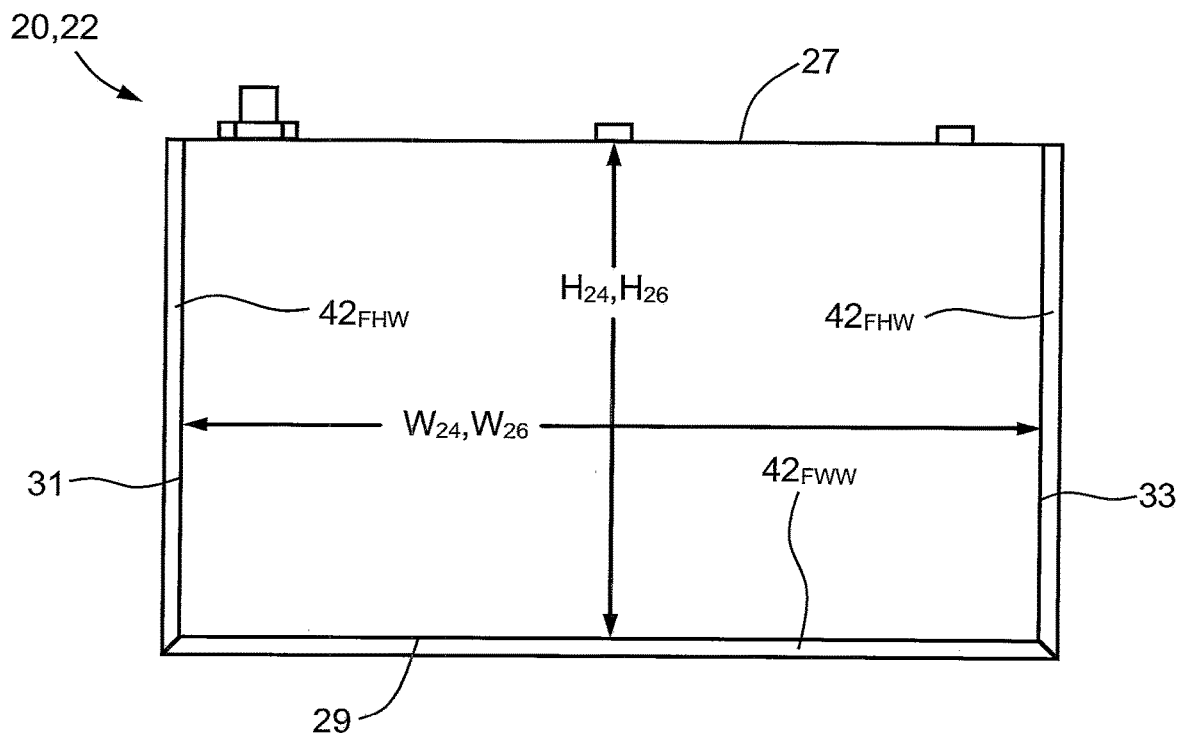

FIGS. 20 and 21 show schematic front views of two alternative configurations of a battery system 20. In these two configurations, the enclosure 22 has a generally rectangular prismatic shape in which the perimetral wall 28 has four "corners" (formed by the meeting of the top, bottom, left and right surfaces 27, 29, 31, 33), and the longitudinal embossments 42 extend or wrap around the two lower corners. For example, in FIG. 20, the longitudinal embossment(s) 42 extend continuously along parts of the left and right surfaces 31, 33 and along the entirety of the bottom surface 29, with a "partial height wrap-around" embossment $42_{PHW}$ on each of the left and right surfaces 31, 33 and a "full width wrap-around" embossment $42_{FWW}$ on the bottom surface 29. And in FIG. 21, the longitudinal embossment(s) 42 extend continuously along the entireties of the left and right surfaces 31, 33 and along the entirety of the bottom surface 29, with a "full height wrap-around" embossment $42_{FHW}$ on each of the left and right surfaces 31, 33 and a "full width wrap-around" embossment $42_{FWW}$ on the bottom surface 29. Each of these configurations may be viewed as having three individual longitudinal embossments 42 which meet at the two lower corners, or one continuous embossment 42 which wraps around the two lower corners. Although not shown in the drawings, one or more longitudinal embossments 42 may also be formed in the top surface 27 as well.

The full-height longitudinal embossment $42_{FH}$ on the right side of the hybrid configuration extends along and between (and coextensive with) respective first and second right-side portions $44_R$, $46_R$ as illustrated on the right sides of FIGS. 8-9. Note that reference numeral $H_{44RF}$ represents the height of the first right-side portion $44_R$ of the first perimeter 30, which may be viewed as being on the right-front side of the enclosure 22 and which extends along the full height $H_{24}$ of the first (front) major wall 24. Similarly, reference numeral $H_{46RB}$ represents the height of the second right-side portion $46_R$ of the second perimeter 32, which may be viewed as being on the right-back side of the enclosure 22 and which extends along the full height $H_{26}$ of the second (rear/back) major wall 26. Here, $H_{44RF}=H_{46RB}$, with each of these heights $H_{44RF}$, $H_{46RB}$ also being the same as the length $L_{42FH}$ of the full-height embossment $42_{FH}$ on the right side of the enclosure 22, with the embossment $42_{FH}$ extending along the full height $H_{24}$, $H_{26}$ of both walls 24, 26.

On the other hand, the partial-height longitudinal embossment $42_{PH}$ on the left side of the hybrid configuration extends along and between (and coextensive with) respective first and second left-side portions $44_L$, $46_L$ of the first and second perimeters 30, 32, as illustrated on the left sides of FIGS. 8-9. Note that reference numeral $H_{44LF}$ represents the height of the first left-side portion $44_L$ of the first perimeter 30, which may be viewed as being on the left-front side of the enclosure 22 and which extends along a portion of (i.e., less than) the full height $H_{24}$ of the first (front) major wall 24. Similarly, reference numeral $H_{46LB}$ represents the height of the second left-side portion $46_L$ of the second perimeter 32, which may be viewed as being on the left-back side of the enclosure 22 and which extends along a portion of (i.e., less than) the full height $H_{26}$ of the second (rear/back) major wall 26. Here, $H_{44LF}=H_{46LB}$, with each of these heights $H_{44LF}$, $H_{46LB}$ also being the same as the length $L_{42PH}$ of the partial-height embossment $42_{PH}$ on the left side of the enclosure 22, with the embossment $42_{PH}$ extending along a portion of (i.e., less than) the full height $H_{24}$, $H_{26}$ of both walls 24, 26.

Note that while the hybrid configuration of FIGS. 8-9 show a partial-height longitudinal embossment $42_{PH}$ on the left and a full-height longitudinal embossment $42_{FH}$ on the right, the locations of these embossments $42_{PH}$, $42_{FH}$ may be reversed. Also, one end of a partial-height longitudinal embossment $42_{PH}$ may be flush with a top or bottom surface 27, 29 of the enclosure 22. Additionally, while the drawings show one longitudinal embossment 42 on each of the left and right sides or surfaces 31, 33, there may be two or more longitudinal embossments 42 on one or the other or both sides or surfaces 31, 33. In each configuration or arrangement of the enclosure 22 and battery system 20, each longitudinal embossment 42 extends along and between (and coextensive with) opposed adjacent portions 44, 46 of the first and second perimeters 30, 32 of the first and second major walls 24, 26.

A wall port 48 is defined in and extends through the perimetral wall 28 in fluid communication with the interior 34 of the enclosure 22. For example, as illustrated in the drawings, the wall port 48 may be formed in the top surface 27, and optionally may be located closer to one side (e.g., the left surface 31) than the other side. The wall port 48 is configured for permitting flow of the liquid electrolyte 40 therethrough, such as for flow of electrolyte 40 into the interior 34 for filling the enclosure 22 and flow of electrolyte 40 out of the interior 34 for partially or fully evacuating or emptying the enclosure 22. The wall port 48 may also be disposed in fluid communication with the respective conduits or channels 54 of the one or more longitudinal embossments 42, such that the conduit(s) 54 permit flow of gas byproduct 58 therethrough. That is, the gas byproduct 58 that is produced by the anode/cathode assemblies 36, 38 may be vented along the conduit(s) 54 and through the wall port 48, and thus vented out of the enclosure 22. In some configurations, a void 57 may be provided along the top of the interior 34, above the anode/cathode assemblies 36, 38, such that the void 57 provides a fluid path (i.e., fluid communication) between the one or more longitudinal embossments 42 on the right side of the enclosure 22 with the one or more longitudinal embossments 42 on the left side of the enclosure 22, In this way, gas byproduct 58 may be conveyed along longitudinal embossments 42 on both the left and right sides of the enclosure 22 and then conveyed through the wall port 48 and out of the enclosure 22.

In addition to the wall port 48, first and second electrodes 50, 52 extend through the perimetral wall 28 as well, with the first electrode 50 being configured for electrical connection with an anode assembly 36 operatively disposed within the interior 34, and with the second electrode 52 being configured for electrical connection with a cathode assembly 38 also operatively disposed within the interior 34. As illustrated in FIG. 6, a first portion 51 of the first electrode 50 may extend into the interior 34 and electrically connect with the anode assembly 36, and a second portion 53 of the second electrode 52 may extend into the interior 34 and electrically connect with the cathode assembly 38. The battery assembly 20 may further include the aforementioned anode assembly 36, cathode assembly 38 and electrolyte 40 operatively disposed within the interior 34 of the enclosure 22, along with an optional intermediate layer 37 sandwiched between the anode and cathode assemblies 36, 38. As mentioned above, the anode and cathode assemblies 36, 38 and optional intermediate layer 37 may be configured and arranged so as to be permeated by liquid electrolyte 40. The anode and cathode assemblies 36, 38 and optional intermediate layer 37 may be stacked, rolled or otherwise disposed with respect to each other within the interior 34.

Figure 11:
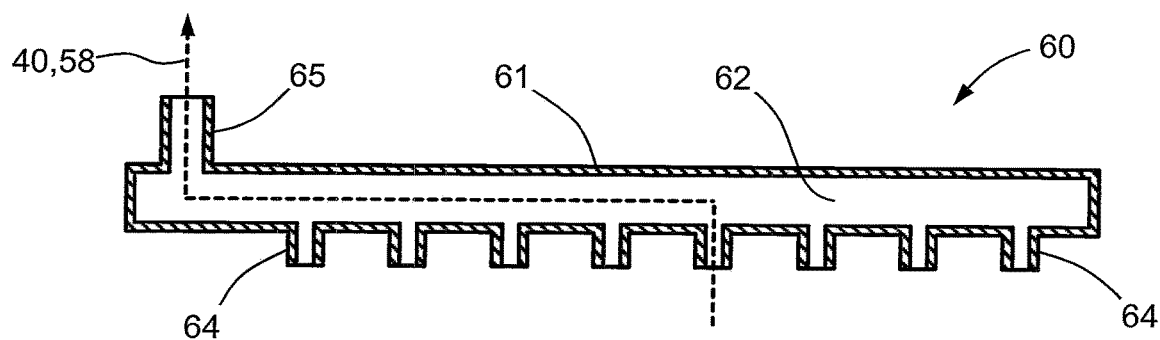
FIG. 11 is a schematic cross-sectional side view of the manifold of FIG. 10.

As illustrated in FIGS. 10-11, the battery system 20 may further include a manifold 60 configured for connection with multiple enclosures 22, thus forming a multi-cell battery pack 20(wherein each enclosure 22 comprises a single battery cell). The manifold 60 has a main body 61 having an inner channel 62 therein and a plurality of fittings 64 each in fluid communication with the inner channel 62. The fittings 64 may be configured for sealably coupling with the wall ports 48 of multiple enclosures 22 for permitting flow of electrolyte 40 between the inner channel 62 of the manifold 60 and the interiors 34 of the enclosures 22. The fittings 64 and inner channel 62 may also be configured for conveying gas byproduct 58 from the fittings 64 (i.e., from each of the enclosures 22 attached to the fittings 64) to a coupling 65 which is in fluid communication with the inner channel 62 and which is configured for sealably interfacing with a first duct $D_1$ (discussed in further detail below). Note that as used herein, a "duct" may include a pipe, tube, conduit or other generally closed passageway for conveying fluids such as gasses or liquids.

Figure 12:
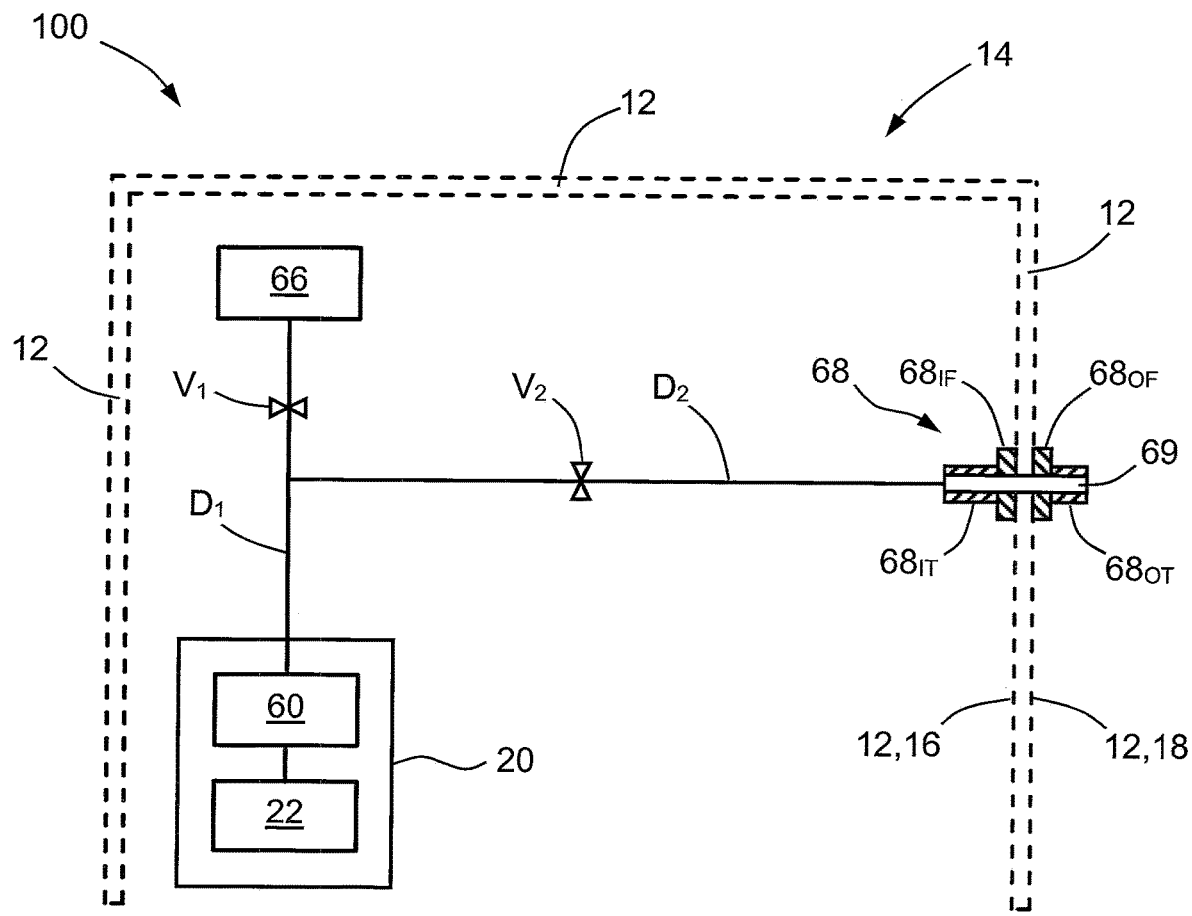
FIG. 12 is a schematic view of a battery pack handling system for an automotive vehicle.

FIG. 12 shows a schematic diagram of the battery system 20 which further includes a gas handler 66 operatively connected with the manifold 60 for receiving and/or filtering gas byproduct 58 from the interior 34 of each enclosure 22 that is operatively connected with the manifold 60. The gas handler 66 may be operatively connected with the coupling 65 of the manifold 60 via a first duct $D_1$, such that the gas handler 66 may "passively" receive gas byproduct 58 via the first duct $D_1$ due to pressure built up by the gas byproduct 58, and/or such that the gas handler 66 may "actively" receive the gas byproduct 58 via the first duct $D_1$ by generating suction which draws the gas byproduct 58 into the gas handler 66. The gas handler 66 may be configured to store the gas byproduct 58, and/or it may be configured to pass along the gas byproduct 58 to a receptacle or other device. The battery system 20 may further include a refill port 68 operatively connected with the manifold 60 for evacuating electrolyte 40 from the interiors 34 of the enclosures 22 (i.e., for fully or partially emptying used electrolyte 40 from the enclosures 22) and for introducing electrolyte 40 into the interiors 34 of the enclosures 22 (i.e., for fully or partially filling the enclosures 22 with fresh electrolyte 40). The refill port 68 may be configured for fastenable extension through a housing wall 12 of a housing 14 (such as through an exterior body panel 12 of an automotive vehicle 10, or through an outer wall 12 of a building 14), wherein the housing 14 is configured for containing the enclosure 22, the manifold 60 and the gas handler 66 within the housing 14. The refill port 68 may include an inner and outer tubular portions $68_{1T}$, $68_{OT}$ which may be held in place against the inner and outer surfaces 16, 18 of the housing wall 12 by inner and outer flanges $68_{1F}$, $68_{OF}$ with a channel 69 defined through the refill port 68 for conveying electrolyte 40 and/or gas byproduct 58 therethrough. The refill port 68 may also include a cover or other device (not shown) for closing and opening the channel 69 and refill port 68, such that when the channel 69 is open fluids may pass therethrough, and when the channel is closed the flow of fluids therethrough is prevented. (Note that as used herein, a "fluid" may be a liquid, a gas or a combination thereof.)

The battery system 20 may further include the first duct $D_1$ operatively connecting the manifold 60 and the gas handler 66, a first valve $V_1$ disposed in the first duct $D_1$ and configured to open and close flow of gas byproduct 58 through the first duct $D_1$, a second duct $D_2$ operatively connecting the manifold 60 and the refill port 68, and a second valve $V_2$ disposed in the second duct $D_2$ and configured to open and close flow of electrolyte 40 and/or gas byproduct 58 through the second duct $D_2$.

FIGS. 14-17 show schematic views of first, second, third and fourth arrangements, respectively, of additional elements which may be incorporated into the battery system 20. These additional elements may be viewed as comprising an electrolyte evacuation and refill station 200 which may be added to, used along with, and/or included as part of the battery system 20, as further described below. To assist in understanding these four arrangements, TABLE 1 is provided below, which shows the valve states (i.e., whether each valve is open or closed) among the third, fourth, fifth and sixth valves $V_3$, $V_4$, $V_5$, $V_6$ and whether each configuration is set up to evacuate the enclosures 22 of liquid electrolyte 40 or to fill the enclosures 22 with liquid electrolyte 40.

TABLE 1

Valve States in the Four Configurations of FIGS. 14-17

| Valve | First Configuration (FIG. 14) Second Pump/1-way (No Third Pump) | | Second Configuration (FIG. 15) Second Pump/2-way (No Third Pump) | | Third Configuration (FIG. 16) Second Pump/1-way + Third Pump/Suction | | Fourth Configuration (FIG. 17) Second Pump/1-way + Third Pump/Pressure | |
|---|---|---|---|---|---|---|---|---|
|  | Evacuate | Fill | Evacuate | Fill | Evacuate | Fill | Evacuate | Fill |
| V3 | Open | Closed | — | — | Open | Closed | Open | Closed |
| V4 | Open | Closed | Open | Closed | — | — | — | — |
| V5 | Closed | Open | Closed | Open | Closed | Open | Closed | Open |
| V6 | Closed | Open | — | — | — | — | — | — |

As shown in FIGS. 14-17, the battery system 20 may further include a boot cover 70, a first pump 86 and a second pump 88. The boot cover 70 (shown in schematic cross-sectional view in FIG. 18) may have a wrap-around wall 72 surrounding and defining a plenum or chamber 74 therewithin, an opening 76 in the wrap-around wall 72 defined by a lip 78 about the opening 76, and a gas port 80 and a liquid port 82 each defined in the wrap-around wall 72. For example, the wrap-around wall 72 may be made of a flexible elastomeric material which is chemically resistant to the liquid electrolyte 40, and may optionally be configured in a bellows-like shape. The gas port 80 and liquid port 82 may each sealably extend through the wrap-around wall 72, with one or more optional reinforcing members 85 disposed on one or both sides of the wrap-around wall 72 so as to hold the ports 80, 82 in place, seal the ports 80, 82 against gas or liquid leakage around the ports 80, 82, and reinforce the ports 80, 82 for repeated usage. The gas port 80 may be disposed in fluid communication with the plenum 74 for conveying gas through the gas port 80, and the liquid port 82 may be configured for conveying liquid and gas through the liquid port 82. The liquid port 82 may include an inner connector portion 84 disposed within the plenum 74 and configured for coupling with the refill port 68 (such as with the outer tubular portion $68_{OT}$ of the refill port 68). This configuration may include the use of mating and interlocking features on the inner connector portion 84 and on the refill port 68, such as threads, quick-connect fittings, etc.

The boot cover 70 may be configured for placement over the refill port 68 with the inner connector portion 84 connected with the refill port 68 and the lip 78 in sealed engagement with an outer surface 18 of the housing wall 12. With the inner connector portion 84 and boot cover 70 thusly positioned, and with the refill port 68 opened, liquid electrolyte 40 and gas byproduct 58 may be suctioned from the enclosures 22, through the manifold 60, the first and second ducts $D_1$, $D_2$ and the refill port 68, and out through the liquid port 82. Also, with the wrap-around wall 72 of the boot cover 70 covering the refill port 68 with the lip 78 placed against the outer surface 18 of the housing wall 12, the plenum 74 should be able to capture any stray gas byproduct 58 which might inadvertently leak due to poor coupling between the inner connector portion 84 and the refill port 68, with the gas port 80 being available for conveying away any such leaked gas byproduct 58.

The first pump 86 may be operatively connected with the gas port 80 and configured for applying suction to the gas port 80, while the second pump 88 may be operatively connected with the liquid port 82 and configured for applying suction to the liquid port 82. The battery system 20 may further include a third duct $D_3$ operatively connecting the gas port 80 and the inlet $86_I$ of the first pump 86, and a fourth duct $D_4$ operatively connecting the liquid port 82 and the inlet $88_I$ of the second pump 88. Note that in all four configurations of FIGS. 14-17 the flow path or flow direction of the first pump 86 is shown as a one-way flow in the direction of the dotted-lined arrow from the inlet $86_I$ to the outlet $86_O$. However, in the first, third and fourth configurations of FIGS. 14 and 16-17 the flow direction of the second pump 88 is shown as one-way (1-way) in the direction indicated by the dotted-lined arrow from the second pump's inlet $88_I$ and its outlet $88_O$, while in the second configuration of FIG. 15 the flow direction is shown as two-way (2-way), meaning that the second pump 88 may selectively pump in either of the two directions (i.e., from the first inlet/outlet $88_I$ to the second inlet/outlet $88_2$, or vice versa). This 1-way or 2-way characteristic of the second pump 88 is reflected in the top row of TABLE 1.

The battery system 20 may further include a gas byproduct tank 90 configured for receiving gas byproduct 58 from the first pump 86 via a fifth duct $D_5$ operatively connecting the outlet $86_O$ of the first pump 86 and the gas byproduct tank 90, and a used electrolyte tank 92 configured for receiving used electrolyte 40 from the second pump 88 via a sixth duct $D_6$ operatively connecting the outlet $88_O$ of the second pump 88 and the used electrolyte tank 92. The sixth duct $D_6$ may optionally have a fourth valve $V_4$ therein, as shown in the first and second configurations of FIGS. 14-15.

The battery system 20 may also include a fresh electrolyte tank 94 configured for supplying fresh (unused) electrolyte 40 to the liquid port 82. The electrolyte 40 from the fresh electrolyte tank 94 may be supplied to the liquid port 82 by use of the second pump 88 as illustrated in the first and second configurations of FIGS. 14-15, or by use of a third pump 96 as illustrated in the third and fourth configurations of FIGS. 16-17.

Figure 14:
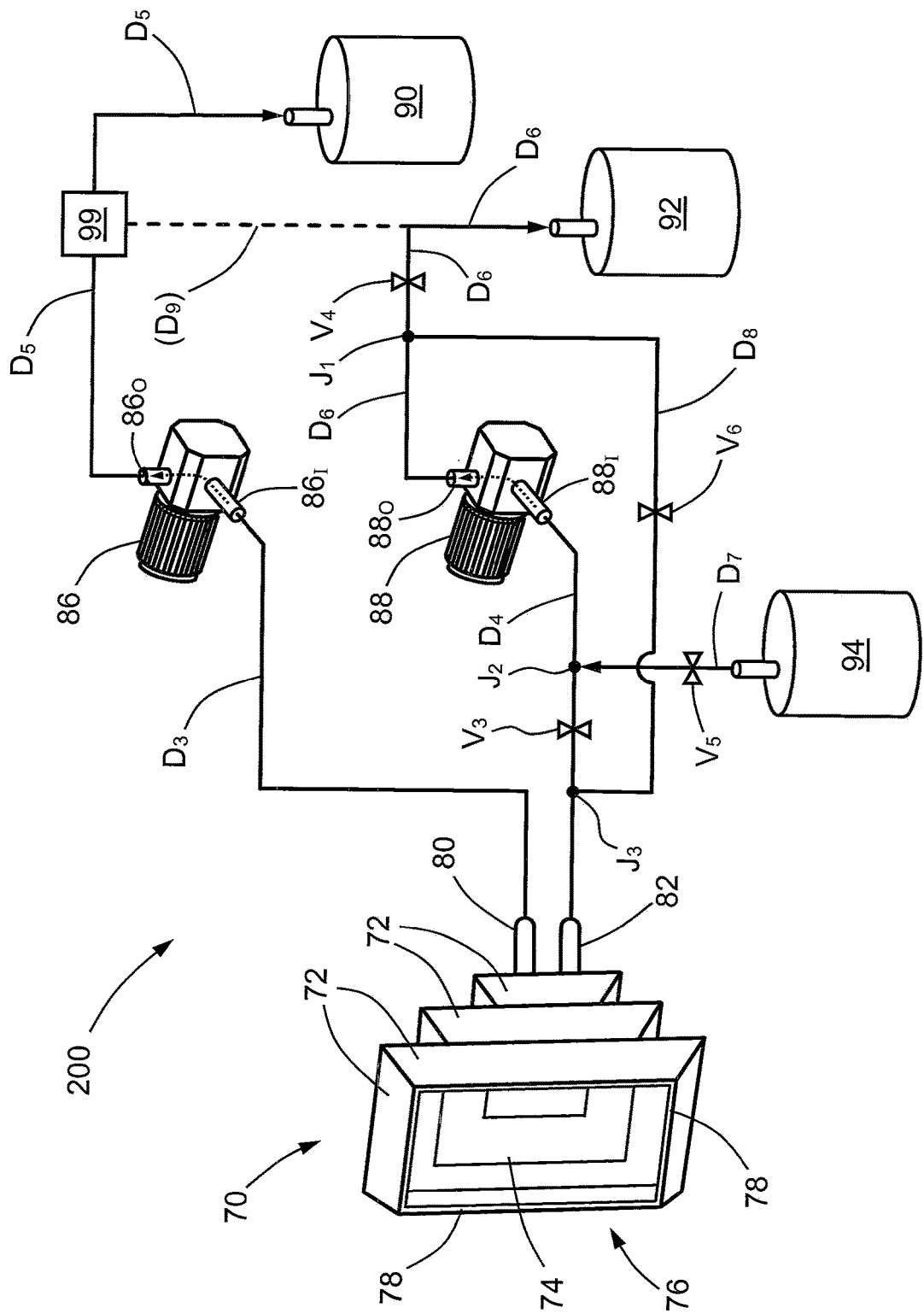
FIGS. 14-17 are schematic views of first through fourth configurations, respectively, of an electrolyte evacuation and refill station.
Figure 15:
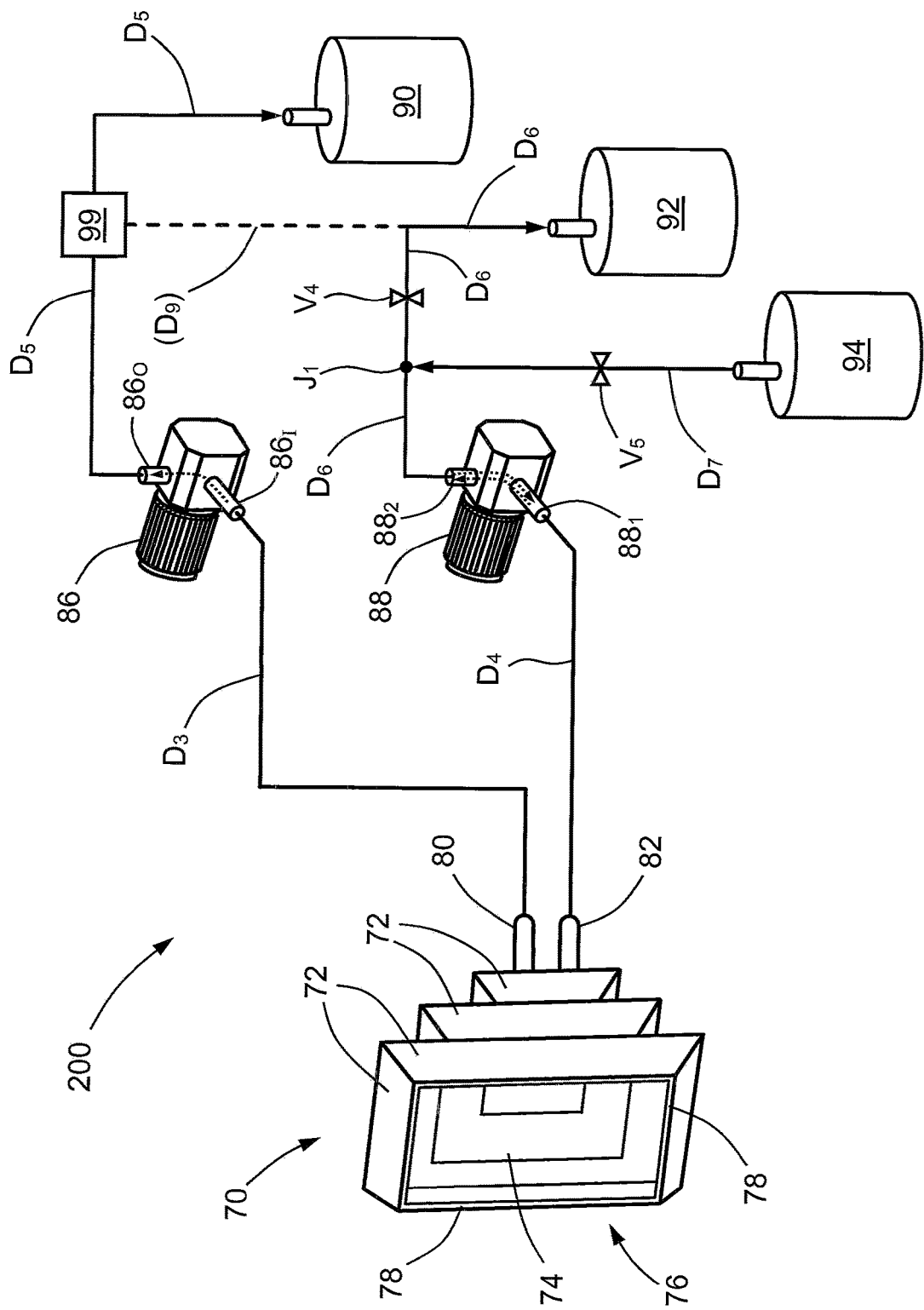

In the first and second configurations of FIGS. 14-15, the second pump 88 is operatively connected with the liquid port 82 and/or the fresh electrolyte tank 94 and is further configured to cause electrolyte 40 from the fresh electrolyte tank 94 to be pumped to the liquid port 82. For example, in the first configuration of FIG. 14, the second pump 88 is capable of 1-way flow, with the inlet $88_I$ of the second pump 88 operatively connected with the fluid port 82 via the fourth duct $D_4$, and the outlet $88_O$ of the second pump 88 operatively connected with the sixth duct $D_6$. By selectively opening and closing certain valves in the ducts (as described below), the second pump 88 may be used for evacuating the used electrolyte 40 from the enclosures 22 and into the used electrolyte tank 92, as well as for delivering fresh electrolyte 40 from the fresh electrolyte tank 94 to the enclosures 22. In this first configuration of FIG. 14, a seventh duct $D_7$ operatively connects the fresh electrolyte tank 94 with the fourth duct $D_4$ at a second junction $J_2$, and an eighth duct $D_8$ operatively connects the sixth duct $D_6$ at a first junction $J_1$ with the fourth duct $D_4$ at a third junction $J_3$, with a third valve $V_3$ being disposed between the second and third junctions $J_2$, $J_3$ and a fourth valve $V_4$ being disposed between the first junction $J_1$ and the used electrolyte tank 92. A fifth valve $V_5$ may be disposed in the seventh duct $D_7$ between the second junction $J_2$ and the fresh electrolyte tank 94, and a sixth valve $V_6$ may be disposed in the eighth duct $D_8$ (i.e., between the first and third junctions $J_1$, $J_3$).

As noted in TABLE 1, when the first configuration is placed in "Evacuate" mode, the third and fourth valves $V_3$, $V_4$ are open and the fifth and sixth valves $V_5$, $V_6$ are closed. This arrangement permits the used electrolyte 40 to be suctioned through the fourth duct $D_4$ and into the second pump 88, and then pumped through the sixth duct $D_6$ into the used electrolyte tank 92, while the closed fifth valve $V_5$ prevents any flow of used electrolyte 40 into the fresh electrolyte tank 94 and the closed sixth valve $V_6$ prevents any backflow of used electrolyte 40 through the eighth duct $D_8$. Then, when the first configuration is placed in "Fill" mode, the settings of the valves are reversed from that of the Evacuate mode. That is, in Fill mode, the third and fourth valves $V_3$, $V_4$ are closed and the fifth and sixth valves $V_5$, $V_6$ are open. This Fill mode arrangement permits the fresh electrolyte 40 to be suctioned through the seventh duct $D_7$ to the second junction $J_2$ and into the second pump 88 (via the portion of the fourth duct $D_4$ between the second junction $J_2$ and the second pump's inlet $88_I$), and then the fresh electrolyte 40 may be pumped through the sixth duct $D_6$ up to the first junction $J_1$, then through the eighth duct $D_8$, and then through the portion of the fourth duct $D_4$ that is between the third junction $J_3$ and the liquid port 82.

On the other hand, in the second configuration of FIG. 15, the second pump 88 is capable of 2-way flow (i.e., flow in either of two directions). In this configuration, the second pump 88 has two ports, each of which may be an inlet or an outlet depending on the direction of flow selected. One of these two ports may be referred to as the first inlet/outlet $88_1$ and the other port may be referred to as the second inlet/outlet $88_2$. The first inlet/outlet $88_1$ is operatively connected with the fluid port 82 via the fourth duct $D_4$, and the second inlet/outlet $88_2$ is operatively connected with the used electrolyte tank 92 via the sixth duct $D_6$. Whereas in the first configuration of FIG. 14 the seventh duct $D_7$ connected the fresh electrolyte tank 94 to the fourth duct $D_4$ at the second junction $J_2$, in the present second configuration of FIG. 15 the seventh duct $D_7$ connects the fresh electrolyte tank 94 to the sixth duct $D_6$ at the first junction $J_1$. Similar to the first configuration, in the present second configuration the fourth valve $V_4$ may be disposed in the sixth duct $D_6$ between the first junction $J_1$ and the used electrolyte tank 92, and the fifth valve $V_5$ may be disposed in the seventh duct $D_7$. As shown in TABLE 1, when the second configuration is in the Evacuate mode, the fourth valve $V_4$ is open and the fifth valve $V_5$ is closed. (Note that the second configuration does utilize the third or sixth valves $V_3$, $V_6$.) In this Evacuate mode arrangement, used electrolyte 40 may be suctioned from the liquid port 82 into the first inlet/outlet $88_1$ of the second pump 88 via the fourth duct $D_4$, with the used electrolyte 40 then being pumped into the used electrolyte tank 92 via the sixth duct $D_6$. With the fifth valve $V_5$ being closed, used electrolyte 40 is prevented from being conveyed into the fresh electrolyte tank 94 via the seventh duct $D_7$. Then, with the valve states switched into the Fill mode arrangement, the flow direction of the second pump 88 may be reversed, so that fresh electrolyte 40 may be suctioned up from the fresh electrolyte tank 94 via the seventh duct $D_7$ and into the second inlet/outlet $88_2$, and then the fresh electrolyte 40 may be pumped from the first inlet/outlet $88_1$ to the liquid port 82 via the fourth duct $D_4$.

Figure 16:
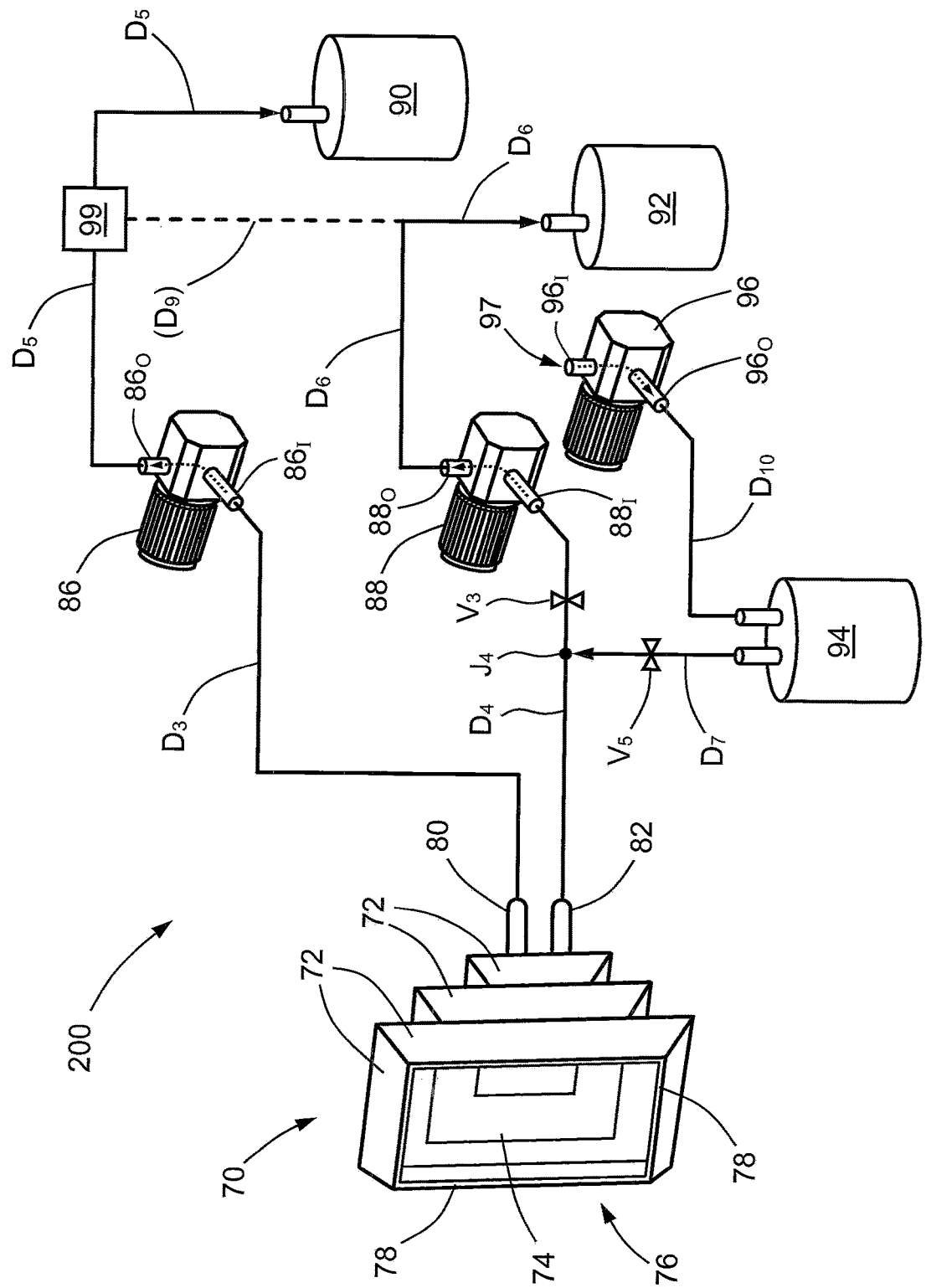
Figure 17:
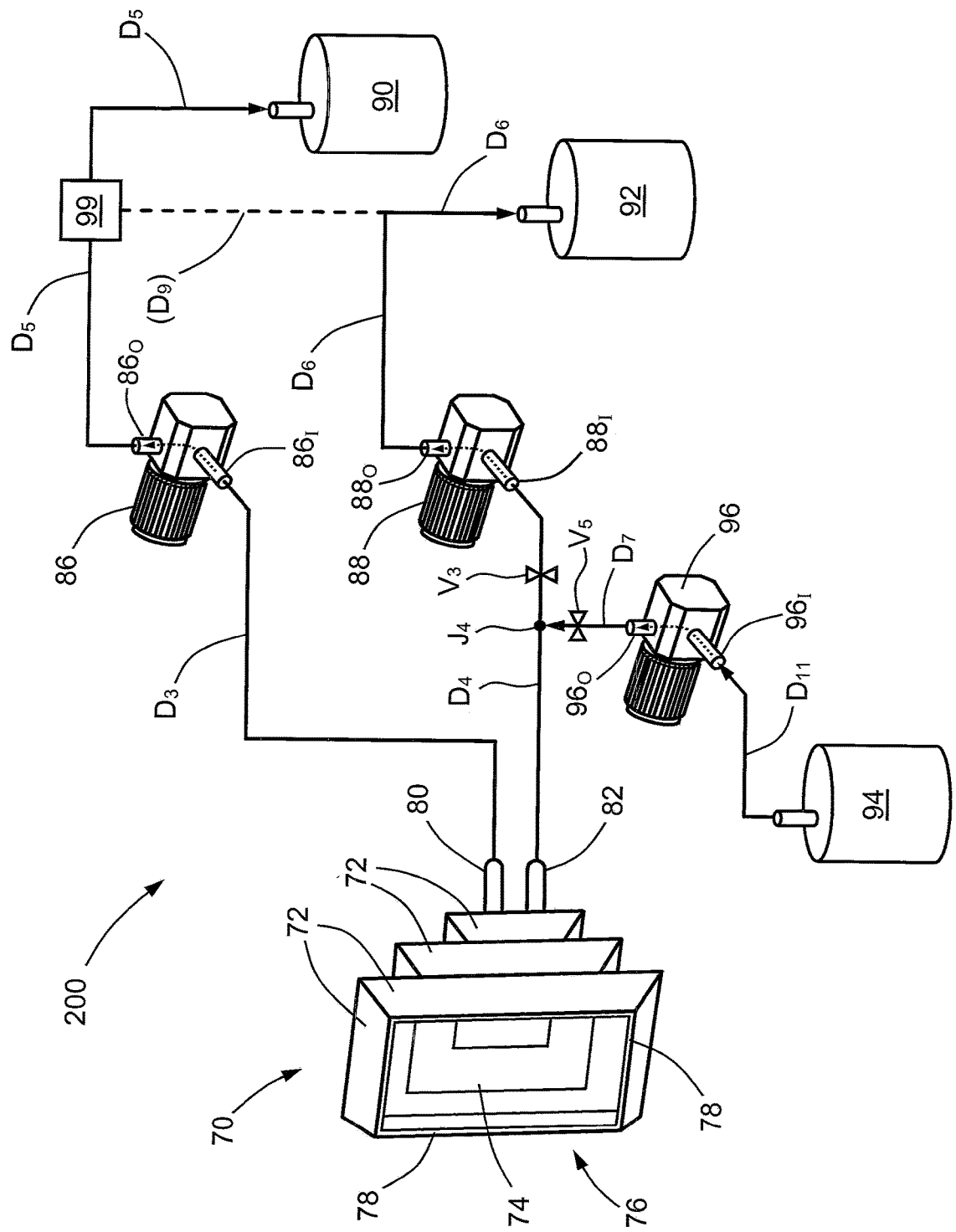
Figure 18:
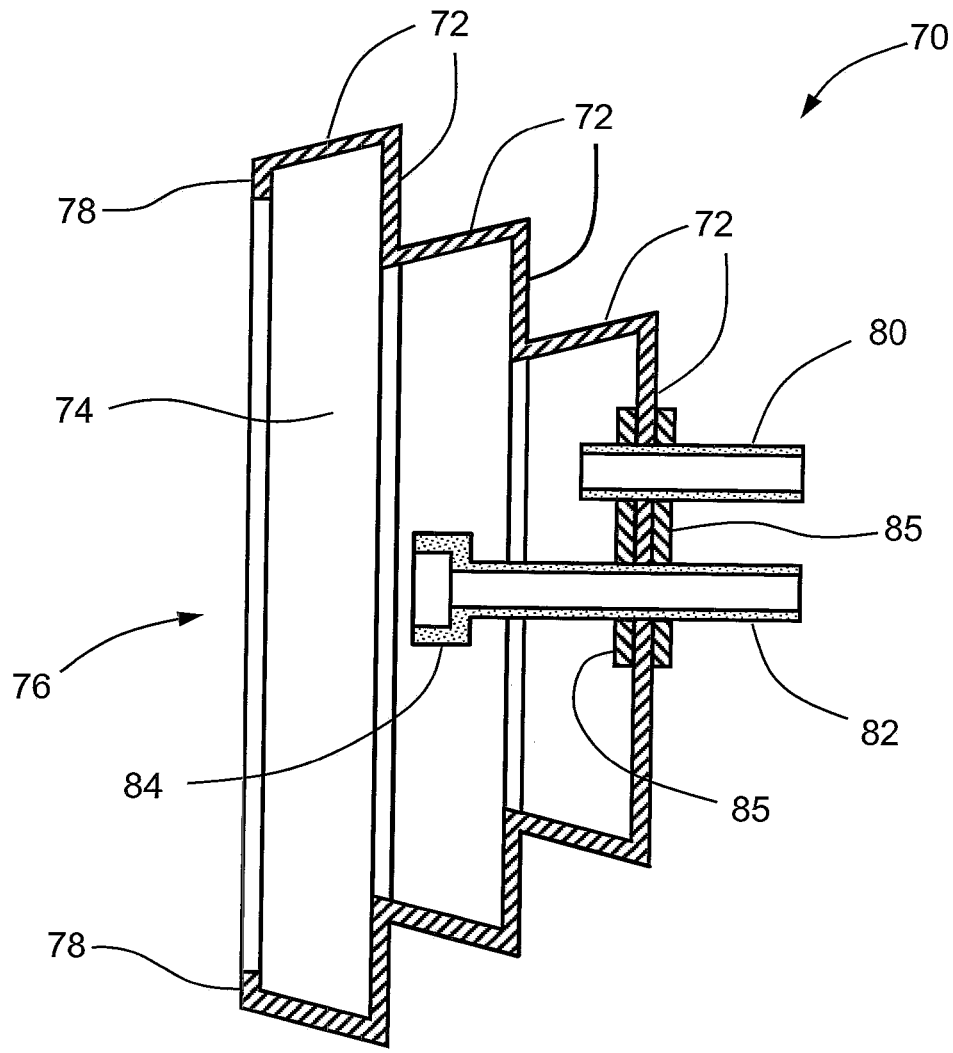
FIG. 18 is a schematic cross-sectional side view of a boot cover for use in an electrolyte evacuation and refill station.

Alternatively, in the third and fourth configurations of FIGS. 16-17, the battery system 20 includes a third pump 96 operatively connected with the liquid port 82 and/or the fresh electrolyte tank 94 and configured to cause electrolyte 40 from the fresh electrolyte tank 94 to be pumped to the liquid port 82. In both the third and fourth configurations, the third pump 96 is capable of 1-way flow in the direction indicated by the dotted-line arrow from the inlet $96_I$ to the outlet $96_O$ of the third pump 96. For example, in the third configuration of FIG. 16, a fluid 97 (e.g., air) may be drawn into the inlet $96_I$ and pumped from the pump outlet $96_O$ into an inlet on the fresh electrolyte tank 94 via a tenth duct $D_{10}$. If the fresh electrolyte tank 94 is properly sealed, the pressurized pumping of fluid 97 into the tank 94 may cause fresh electrolyte 40 to be forced out of the outlet of the tank 94, and into the seventh duct $D_7$. According to TABLE 1, when the valves of the third configuration are placed into the Evacuation mode arrangement, the third valve $V_3$ will be open and the fifth valve $V_5$ will be closed. (Note that the third configuration does not include the fourth and sixth valves $V_4$, $V_6$.) This arrangement permits used electrolyte 40 to be conveyed from the liquid port 82 to the second pump 88 via the fourth duct $D_4$ and then onto the used electrolyte tank 92 via the sixth duct $D_6$. In this Evacuation mode for the third configuration, the second pump 88 is operating but the third pump 96 is not. Meanwhile, with the fifth valve $V_5$ being closed, used electrolyte 40 is prevented from entering into the fresh electrolyte tank 94 via the seventh duct $D_7$. Then, when the third configuration is placed into Fill mode, the third valve $V_3$ is closed, the fifth valve $V_5$ is open, the second pump 88 may be turned off, and the third pump 96 may be turned on. This arrangement permits fresh electrolyte 40 to be conveyed from the fresh electrolyte tank 94 to the fourth joint $J_4$ and then to the liquid port 82, while preventing flow of fresh electrolyte 40 past the closed third valve $V_3$.

And in the fourth configuration of FIG. 17, the inlet $96_I$ of the third pump 96 may be operatively connected with the fresh electrolyte tank 94 via an eleventh duct $D_{11}$, while the outlet $96_O$ of the third pump 96 may operatively connect with the fourth duct $D_4$ at the fourth junction $J_4$ via the seventh duct $D_7$ As in the third configuration, the third valve $V_3$ may be disposed in the fourth duct $D_4$ between the fourth junction $J_4$ and the inlet $88_I$ of the second pump 88, and the fifth valve $V_5$ may be disposed in the seventh duct $D_7$. As shown in TABLE 1, when the fourth configuration is in the Evacuate mode, the third valve $V_3$ is open and the fifth valve $V_5$ is closed. (Note that like the third configuration, the fourth configuration does not include the fourth and sixth valves $V_4$, $V_6$.) In the Evacuate mode arrangement, used electrolyte 40 may be suctioned from the liquid port 82 to the inlet $88_I$ of the second pump via the fourth duct $D_4$, and then may be conveyed to the used electrolyte tank 92 via the sixth duct $D_6$. Then, in the Fill mode arrangement, the third valve $V_3$ is closed and the fifth valve $V_5$ is opened. This arrangement permits fresh electrolyte 40 to be suctioned from the fresh electrolyte tank 94 to the inlet $96_I$ of the third pump 96 via the eleventh duct $D_{11}$, and then conveyed through the seventh duct $D_7$ to the fourth joint $J_4$ and then to the liquid port 82 via the fourth duct $D_4$, while preventing flow of fresh electrolyte 40 past the closed third valve $V_3$.

Figure 13:
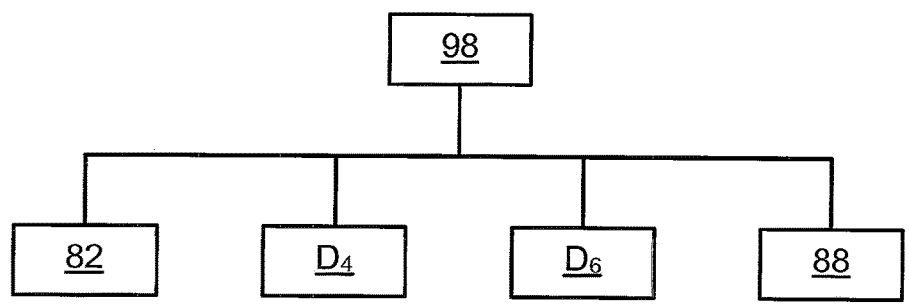
FIG. 13 is a block diagram of a sample collector and/or tester and possible connection points within an electrolyte evacuation and refill station.

Optionally, a gas/liquid separator 99 may be disposed in the fifth duct $D_5$, which may be configured to separate out any electrolyte 40 or other liquids from the gas byproduct 58. For example, the gas/liquid separator 99 may comprise or include an evaporator or chiller. The optional gas/liquid separator 99 has two outlets: one outlet attached directly or indirectly to the gas byproduct tank 90 for conveyance of the gas byproduct 58, and the other outlet for conveyance of any electrolyte 40 or other liquids and which may be connected with an optional ninth duct $D_9$ (shown in parentheses and as a dashed line) connected with the sixth duct $D_6$. Although not explicitly shown in FIGS. 14-17, the battery system 20 may additionally include a sample collector and/or tester 98 configured for receiving and/or testing a sample of electrolyte 40 from the enclosure 22. As illustrated in FIG. 13, the collector/tester 98 may be operatively connected with at least one of the liquid port 82, the fourth duct $D_4$, the sixth duct $D_6$ and the second pump 88. The collector/tester 98 may be used to collect and/or test a sample of used electrolyte 40 to determine its initial fluoroethylene carbonate/ethyl methyl carbonate (FEC/EMC) molar ratio, which may be used to determine the amount of fresh electrolyte 40 that should be added, depending on the concentration of the fresh electrolyte 40. The collector/tester 98 may be configured to receive and store a sample of used electrolyte 40 which can be tested by a nuclear magnetic resonance (NMR) tester or other apparatus (e.g., in a separate testing lab) to determine the FEC/EMC molar ratio of the harvested sample of electrolyte 40; or, the collector/tester 98 may also include or comprise an in situ NMR tester or other apparatus for evaluating the harvested sample of electrolyte 40.

Figure 19:
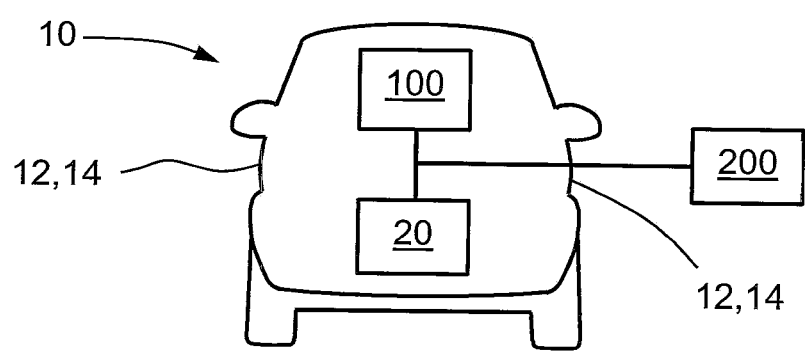
FIG. 19 is a schematic diagram of a battery system, a battery pack handling system and an electrolyte evacuation and refill station for an automotive vehicle.

Returning once again to FIG. 12, and with additional reference to FIG. 19, another embodiment of the present disclosure includes a battery pack handling system 100 for an automotive vehicle 10, where the automotive vehicle 10 has a housing wall or exterior body panel 12 as part of its exterior 14 and carries an on-board battery pack/battery system 20. The battery pack handling system 100 includes a gas handler 66 configured for receiving gas byproduct 58 from the battery pack 20 (e.g., from a manifold 60 operatively connected with one or more enclosures 22), a first duct $D_1$ configured for conveying the gas byproduct 58 from the battery pack 20 to the gas handler 66, a refill port 68 configured for fastenable extension through the exterior body panel 12 and for connecting with the battery pack 20 (wherein the refill port 68 is configured for evacuating used electrolyte 40 from the battery pack 20 and for introducing fresh electrolyte 40 into the battery pack 20), and a second duct $D_2$ configured for conveying electrolyte 40 between the battery pack 20 and the refill port 68. The gas handler 66 may be configured to be disposed above the battery pack 20(since gas byproduct 58 may be lighter than air), and the gas handler 66 may be further configured for filtering the gas byproduct 58 received from the battery pack 20. A first valve $V_1$ may be disposed in the first duct $D_1$ and configured to open and close flow of gas byproduct 58 through the first duct $D_1$, and a second valve $V_2$ may be disposed in the second duct $D_2$ and configured to open and close flow of electrolyte 40 and/or gas byproduct 58 through the second duct $D_2$.

Returning to FIGS. 14-17, first through fourth configurations, respectively, are shown of yet another embodiment according to the present disclosure. Each configuration is of an electrolyte evacuation and refill station 200 for servicing a battery pack 20 carried on-board an automotive vehicle 10, in which the automotive vehicle 10 has a refill port 68 operatively connected with the battery pack 20 and extending through an exterior body panel 12 of the vehicle 10. Each configuration includes: (i) a boot cover 70 having a wrap-around wall 72 surrounding and defining a plenum 74 therewithin, an opening 76 in the wrap-around wall 72 defined by a lip 78 about the opening 76, and a gas port 80 and a liquid port 82 each defined in the wrap-around wall 72, wherein the gas port 80 is in fluid communication with the plenum 74, and wherein the liquid port 82 has an inner connector portion 84 disposed within the plenum 74 and configured for coupling with the refill port 68 when the boot cover 70 is placed over the refill port 68 with the lip 78 in sealed engagement with the exterior body panel 12; (ii) a first pump 86 operatively connected with the gas port 80 and configured for applying suction to the gas port 80; (iii) a second pump 88 operatively connected with the liquid port 82 and configured for applying suction and/or pressure to the liquid port 82; (iv) a gas byproduct tank 90 operatively connected with a first outlet 86$_O$ of the first pump 86 and configured for receiving gas byproduct 58 from the battery pack 20 via the refill port 68 and the first pump 86; (v) a used electrolyte tank 92 operatively connected with a second outlet 88$_O$ of the second pump 88 and configured for receiving electrolyte 40 from the battery pack 20 via the refill port 68 and the second pump 88; and (vi) a fresh electrolyte tank 94 configured for supplying electrolyte 40 to the liquid port 82.

The second pump 88 may be operatively connected with the liquid port 82 and/or the fresh electrolyte tank 94 and may be further configured to cause electrolyte 40 from the fresh electrolyte tank 94 to be pumped to the liquid port 82. The electrolyte evacuation and refill station 200 may further include a third pump 98 operatively connected with the liquid port 82 and/or the fresh electrolyte tank 94 and configured to cause electrolyte 40 from the fresh electrolyte tank 94 to be pumped to the liquid port 82. The electrolyte evacuation and refill station 200 may further include a collector/tester 98 (e.g., an NMR tester) configured for receiving and/or testing a sample of electrolyte 40 from the battery pack 20, wherein the collector/tester 98 is operatively connected with at least one of the liquid port 82, the fourth duct $D_4$, the sixth duct $D_6$ and the second pump 88.

Note that while FIG. 19 shows the battery system 20, the battery pack handling system 100, and the electrolyte evacuation and refill station 200 as three separate blocks, the battery pack handling system 100 and/or the electrolyte evacuation and refill station 200 may be included as part of the battery system 20. Also note that the manifold 60 may be part of the battery pack handling system 100, or it can be part of the battery system 20.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "for the most part", "to a significant extent" and/or "to a large degree", and do not necessarily mean "perfectly", "completely", "strictly" or "entirely". Additionally, the terms "operatively connected" and "operatively connecting" may be used herein to describe connections that may be direct, or indirect, or either direct or indirect, as the case may be or may permit.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A battery system, comprising:
   a generally prismatic enclosure having opposed first and second major walls with respective first and second perimeters and respective first and second widths, a perimetral wall connecting the first and second major walls along the first and second perimeters and including one or more generally flat perimetral surfaces, and an interior defined by the first and second major walls and the perimetral wall, wherein the enclosure is configured for containing an anode assembly, a cathode assembly and an electrolyte operatively disposed within the interior, and wherein the perimetral wall has a perimetral wall width as measured between the first and second major walls;
   a longitudinal embossment formed in the perimetral wall extending outward from the interior and from the one or more generally flat perimetral surfaces and extending along opposed adjacent portions of the first and second perimeters, wherein the longitudinal embossment has an embossment width that is less than the perimetral wall width and an outer width as measured across the opposed adjacent portions of the first and second perimeters that is greater than either of the first and second widths;
   a wall port defined in the perimetral wall in fluid communication with the interior, wherein the wall port is configured for permitting flow of the electrolyte therethrough into and out of the interior; and
   first and second electrodes each extending through the perimetral wall and configured for electrical connection with the anode assembly and cathode assembly, respectively.

2. A battery system according to claim 1, further comprising:
   a manifold having an inner channel therein and a plurality of fittings each in fluid communication with the inner channel, each of the fittings configured for coupling with the wall port for permitting flow of the electrolyte between the inner channel of the manifold and the interior of the enclosure.

3. A battery system according to claim 1, wherein each of the first and second major walls is generally rectangular with each having a respective width and a respective height smaller than the respective width, wherein the longitudinal embossment has a length extending along the respective heights.

4. A battery system according to claim 1, further comprising the anode assembly, the cathode assembly and the electrolyte operatively disposed within the interior of the enclosure.

5. A battery system according to claim 1, wherein the longitudinal embossment defines a conduit on an interior side thereof, wherein the conduit is configured for permitting flow of a gas byproduct therethrough.

6. A battery system according to claim 2, further comprising:
the anode assembly, the cathode assembly and the electrolyte operatively disposed within the interior of the enclosure, wherein the first and second electrodes are electrically connected with the anode assembly and cathode assembly, respectively;
a gas handler operatively connected with the manifold for receiving and/or filtering gas byproduct from the interior of the enclosure, wherein the manifold is operatively connected with the enclosure; and
a refill port operatively connected with the manifold for evacuating electrolyte from the interior of the enclosure and for introducing electrolyte into the interior of the enclosure, wherein the refill port is configured for fastenable extension through a housing wall of a housing, wherein the housing is configured for containing the enclosure, the manifold and the gas handler.

7. A battery system according to claim 6, further comprising:
a first duct operatively connecting the manifold and the gas handler;
a first valve disposed in the first duct and configured to open and close flow through the first duct;
a second duct operatively connecting the manifold and the refill port; and
a second valve disposed in the second duct and configured to open and close flow through the second duct.

8. A battery system according to claim 6, further comprising:
a boot cover having a wrap-around wall surrounding and defining a plenum therewithin, an opening in the wrap-around wall defined by a lip about the opening, and a gas port and a liquid port each defined in the wrap-around wall, wherein the gas port is in fluid communication with the plenum, and wherein the liquid port has an inner connector portion disposed within the plenum and configured for coupling with the refill port when the boot cover is placed over the refill port with the lip in sealed engagement with an outer surface of the housing wall;
a first pump operatively connected with the gas port and configured for applying suction to the gas port; and
a second pump operatively connected with the liquid port and configured for applying suction to the liquid port.

9. A battery system according to claim 8, further comprising:
a third duct operatively connecting the gas port and the first pump; and
a fourth duct operatively connecting the liquid port and the second pump.

10. A battery system according to claim 9 further comprising: a gas byproduct tank configured for receiving gas byproduct from the first pump via a fifth duct operatively connecting the first pump and the gas byproduct tank; and a used electrolyte tank configured for receiving electrolyte from the second pump via a sixth duct operatively connecting the second pump and the used electrolyte tank.

11. A battery system according to claim 10, further comprising:
a fresh electrolyte tank configured for supplying electrolyte to the liquid port;
wherein the second pump is operatively connected with the liquid port and/or the fresh electrolyte tank and is further configured to cause electrolyte from the fresh electrolyte tank to be pumped to the liquid port.

12. A battery system according to claim 10, further comprising:
a fresh electrolyte tank configured for supplying electrolyte to the liquid port; and
a third pump operatively connected with the liquid port and/or the fresh electrolyte tank and configured to cause electrolyte from the fresh electrolyte tank to be pumped to the liquid port.

13. A battery system according to claim 10, further comprising:
a collector/tester configured for receiving and/or testing a sample of electrolyte from the enclosure, wherein the collector/tester is operatively connected with at least one of the liquid port, the fourth duct, the sixth duct and the second pump.

* * * * *